United States Patent
Ono et al.

(10) Patent No.: US 9,853,424 B2
(45) Date of Patent: Dec. 26, 2017

(54) GAS INSULATED SWITCHING APPARATUS

(71) Applicant: Mitsubishi Electric Corporation, Tokyo (JP)

(72) Inventors: Yohei Ono, Tokyo (JP); Keiichiro Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/034,154

(22) PCT Filed: Jan. 20, 2014

(86) PCT No.: PCT/JP2014/050966
§ 371 (c)(1),
(2) Date: May 3, 2016

(87) PCT Pub. No.: WO2015/107693
PCT Pub. Date: Jul. 23, 2015

(65) Prior Publication Data
US 2016/0301195 A1 Oct. 13, 2016

(51) Int. Cl.
*H02B 1/24* (2006.01)
*H02B 5/06* (2006.01)
*H02B 13/035* (2006.01)

(52) U.S. Cl.
CPC ............ *H02B 1/24* (2013.01); *H02B 5/06* (2013.01); *H02B 13/0358* (2013.01)

(58) Field of Classification Search
CPC ............ H02B 1/20–1/202; H02B 5/06; H02B 13/035–13/0358; H02B 1/22
See application file for complete search history.

(56) References Cited

U.S. PATENT DOCUMENTS 3,823,346 A * 7/1974 Olsen ................ H02B 1/22
361/604
3,930,188 A * 12/1975 Olsen ................ H02B 1/24
218/45

(Continued)

FOREIGN PATENT DOCUMENTS

DE 1540491 A1 * 1/1970 ............ H02B 5/06
EP 0174251 A2 * 3/1986 ............ H02B 1/22

(Continued)

OTHER PUBLICATIONS

International Search Report (PCT/ISA/210) dated Mar. 4, 2014, by the Japanese Patent Office as the International Searching Authority for International Application No. PCT/JP2014/050966 (three pages) with English-language translation (two pages).

(Continued)

*Primary Examiner* — Robert J Hoffberg
(74) *Attorney, Agent, or Firm* — Buchanan Ingersoll & Rooney PC

(57) ABSTRACT

A gas insulated switching apparatus includes a transformer line unit and a power transmission and reception line unit adjacent to each other. The power transmission and reception line unit includes two cable heads. The cable heads are arranged at an interval between units in an extension direction in which a bus-bar extends, and the cable head is disposed in a space behind the transformer line unit.

4 Claims, 7 Drawing Sheets

(56) References Cited

U.S. PATENT DOCUMENTS

| | | | | |
|---|---|---|---|---|
| 4,503,481 A | * | 3/1985 | Fujiya | H02B 5/06 200/50.21 |
| 4,638,403 A | * | 1/1987 | Amano | H02B 5/06 361/604 |
| 4,744,002 A | * | 5/1988 | Nakano | H02B 1/22 218/80 |
| 4,821,141 A | * | 4/1989 | Torimi | H02B 13/035 361/604 |
| 4,829,400 A | * | 5/1989 | Enomoto | H02B 1/22 361/612 |
| 4,837,662 A | * | 6/1989 | Takeuchi et al. | H02B 1/22 361/612 |
| 4,890,193 A | | 12/1989 | Tsubaki | |
| 4,967,307 A | * | 10/1990 | Itou | H02B 1/22 361/612 |
| 4,996,485 A | * | 2/1991 | Itai | H02B 13/035 218/68 |
| 5,177,664 A | * | 1/1993 | Tsuchiya | H02B 1/22 361/612 |
| 5,898,565 A | * | 4/1999 | Yamauchi | H02B 1/22 337/28 |
| 5,907,122 A | * | 5/1999 | Nakamura | H02B 13/0352 174/17 GF |
| 6,188,034 B1 | * | 2/2001 | Tsuzura | H02B 13/0352 218/155 |
| 6,278,073 B1 | * | 8/2001 | Tsuzura | H01T 4/08 218/43 |
| 6,407,908 B1 | * | 6/2002 | Iryo | H01H 33/42 200/82 B |
| 6,515,247 B1 | * | 2/2003 | Tsuzura | H02B 1/22 218/43 |
| 6,624,372 B1 | | 9/2003 | Ogawa et al. | |
| 7,515,398 B2 | | 4/2009 | Takao et al. | |
| 7,764,486 B2 | * | 7/2010 | Otsuka | H02B 1/22 218/43 |
| 7,835,140 B2 | * | 11/2010 | Mori | H02B 1/22 361/604 |
| 7,911,770 B2 | | 3/2011 | Fujita et al. | |
| 8,000,087 B2 | * | 8/2011 | Fujita | H02B 1/22 218/43 |
| 8,228,665 B2 | * | 7/2012 | Fujita | H02B 5/06 218/10 |
| 8,854,795 B2 | * | 10/2014 | Kim | H02B 5/06 361/605 |
| 9,502,868 B2 | * | 11/2016 | Kagawa | H02B 13/0352 |
| 2002/0070199 A1 | | 6/2002 | Ogawa et al. | |
| 2002/0149904 A1 | * | 10/2002 | Hachida | H02B 5/06 361/605 |

FOREIGN PATENT DOCUMENTS

| | | | | |
|---|---|---|---|---|
| EP | 0348312 B2 | * | 7/1998 | H02B 1/22 |
| FR | 1485325 A | * | 6/1967 | H02B 5/06 |
| JP | 62-201005 | | 9/1987 | |
| JP | 63-310305 A | | 12/1988 | |
| JP | 1989-143215 U | | 10/1989 | |
| JP | 05-015020 A | | 1/1993 | |
| JP | 06-078422 A | | 3/1994 | |
| JP | 07-107628 A | | 4/1995 | |
| JP | 0767214 B2 | * | 7/1995 | H02B 1/22 |
| JP | 07-093774 | | 10/1995 | |
| JP | 2572415 | | 10/1996 | |
| JP | 10-108327 A | | 4/1998 | |
| JP | 10-271625 A | | 10/1998 | |
| JP | 2000-134732 A | | 5/2000 | |
| JP | 2000-341814 A | | 12/2000 | |
| JP | 2001-045621 A | | 2/2001 | |
| JP | 2001-157332 A | | 6/2001 | |
| JP | 2002-186124 A | | 6/2002 | |
| JP | 2003-111221 A | | 4/2003 | |
| JP | 2006-271021 A | | 10/2006 | |
| JP | 4058907 B2 | | 12/2007 | |
| JP | 4902736 B2 | | 3/2012 | |
| JP | 2013-027062 A | | 2/2013 | |
| JP | 2013-143845 A | | 7/2013 | |

OTHER PUBLICATIONS

English-language translation of Office Action, Notice of Reasons for Rejection, dated Jun. 24, 2014, in Japanese Patent Application No. 2014-519736 (three pages).

Written Opinion (PCT/ISA/237) dated Mar. 4, 2014, by the Japanese Patent Office as the International Searching Authority for International Application No. PCT/JP2014/050966.

* cited by examiner

PRIOR ART

PRIOR ART

GAS INSULATED SWITCHING APPARATUS

FIELD

The present invention relates to a gas insulated switching apparatus.

BACKGROUND

Gas insulated switching apparatuses used in power plants, substations, or the like are constituted by combining a plurality of units, such as a power transmission and reception line unit and a transformer line unit, depending on the use form (for example, see Patent Literature 1).

The power transmission and reception line unit is generally provided with a breaker, a bus-bar-side disconnector, a line-side disconnector, a cable head, and the like, and a power cable for transmitting and receiving power is connected to the cable head. The transformer line unit is generally provided with a breaker, a bus-bar-side disconnector, a line-side disconnector, a cable head, and the like, and a power cable connected to the transformer is connected to the cable head. Further, a configuration in which the power transmission and reception line unit and the transformer line unit are disposed adjacent to each other is also common. Further, the power transmission and reception line unit and the transformer line unit are connected to each other by the bus-bar.

Further, in the power transmission and reception line unit, depending on its configuration, there is a case where two power cables are connected. That is, a configuration in which two cable heads are provided in the power transmission and reception line unit and each of the power cables is drawn out of a corresponding cable head is also utilized.

In a conventional gas insulated switching apparatus in which the power transmission and reception line unit has two power cables, two cable heads are connected to a breaker via connection tanks connected in a direction (hereinafter, referred to as a "unit direction") orthogonal to a unit arrangement direction that is a direction in which the bus-bar extends, and are arranged in the unit direction.

CITATION LIST

Patent Literature

Patent Literature 1: Japanese Patent No. 4902736

SUMMARY

Technical Problem

However, with the aforementioned conventional gas insulated switching apparatus, because the two cable heads are arranged in the unit direction, the unit length of the power transmission and reception line unit increases, and the installation area of the gas insulated switching apparatus also increases.

The present invention has been made in view of the above, and an object of the present invention is to provide a gas insulated switching apparatus with a reduced installation area.

Solution to Problem

In order to solve the above problems and achieve the object, a gas insulated switching apparatus according to an aspect of the present invention includes: a power transmission and reception line unit that includes a vertical first breaker and first and second cable heads connected to the first breaker, the first and second cable heads being connected to first and second power cables, respectively; and a transformer line unit that includes a vertical second breaker connected to the first breaker by a bus-bar extending in a horizontal direction orthogonal to an axis of the first breaker and a third cable head connected to the second breaker, and that is disposed adjacent to the power transmission and reception line unit, the third cable head being connected to a third power cable, wherein when viewed from the first breaker, the first cable head is disposed in a unit direction that is a horizontal direction orthogonal to an extension direction in which the bus-bar extends, the first and second cable heads are arranged in the extension direction in which the bus-bar extends at an interval between units, and when viewed from the second breaker, the second cable head is disposed behind the third cable head in the unit direction.

Advantageous Effects of Invention

The present invention achieves an effect of providing a gas insulated switching apparatus with a reduced installation area.

DESCRIPTION OF EMBODIMENTS

A gas insulated switching apparatus according to embodiments of the present invention will be described below in detail with reference to the drawings. The present invention is not limited by the embodiments.

First Embodiment

Figure 1:
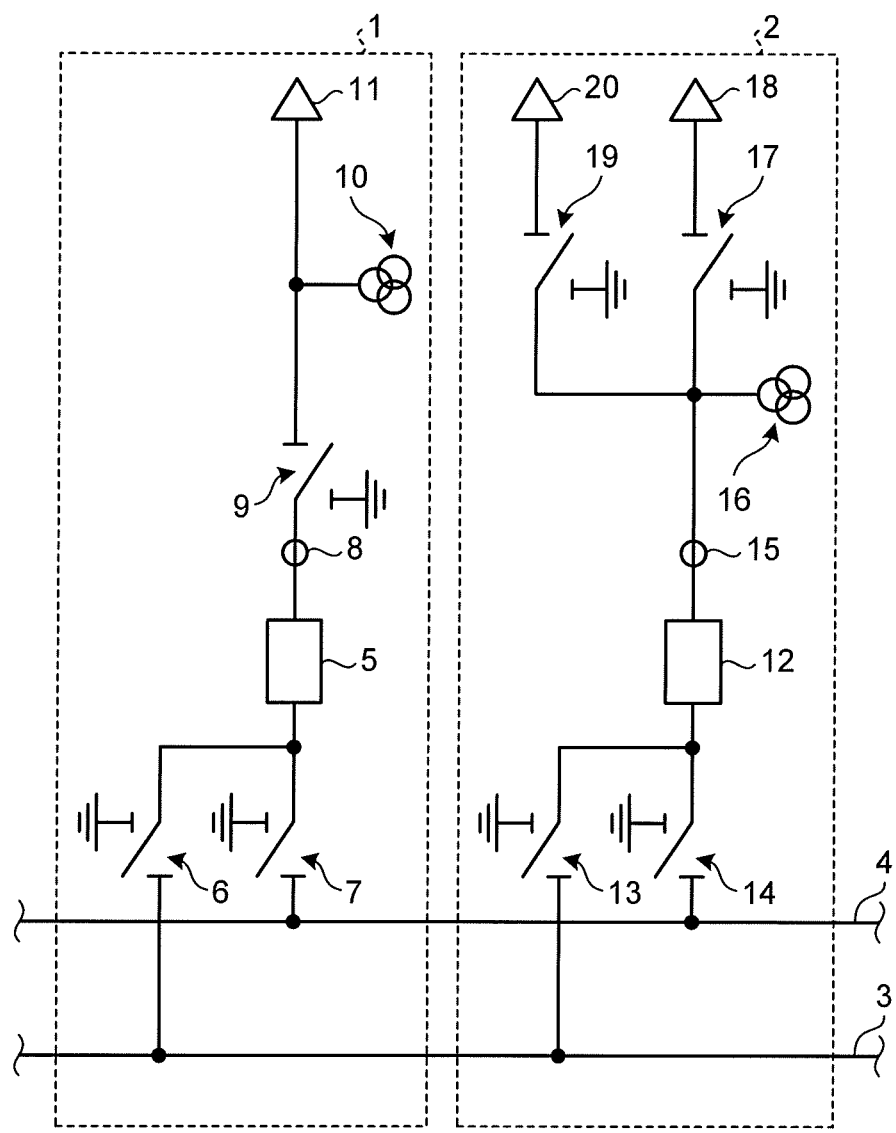
FIG. 1 is a single-line diagram illustrating a configuration of a gas insulated switching apparatus according to a first embodiment.
Figure 2:
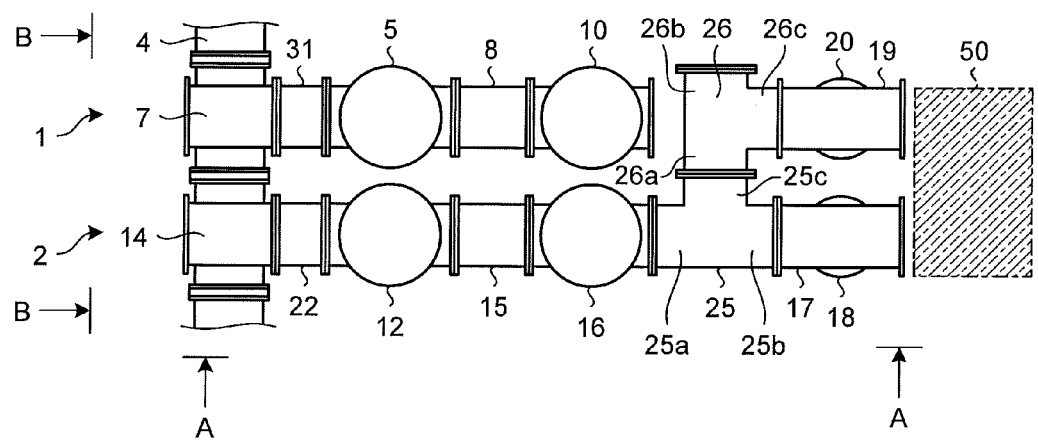
FIG. 2 is a top view illustrating a configuration of the gas insulated switching apparatus according to the first embodiment.
Figure 3:
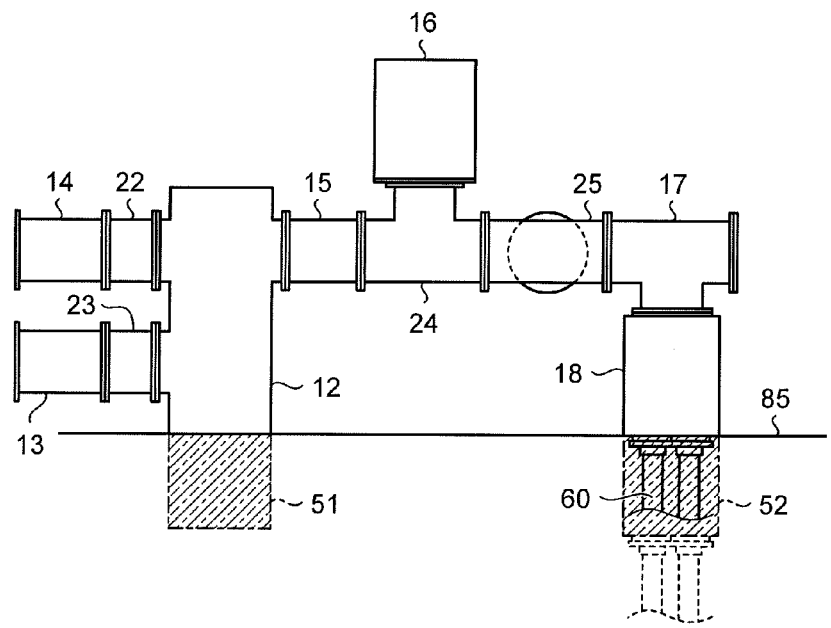
FIG. 3 is a side view of a power transmission and reception line unit taken along line A-A in FIG. 2.
Figure 4:
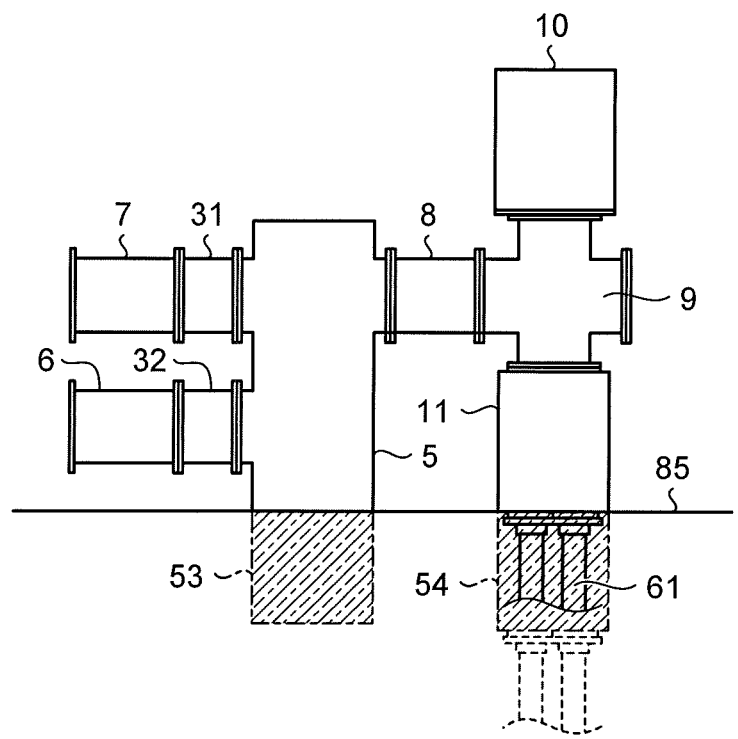
FIG. 4 is a side view of a transformer line unit in FIG. 2 as viewed from the same direction as in FIG. 3.
Figure 5:
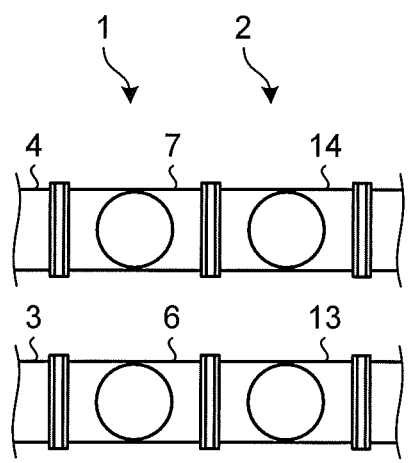
FIG. 5 is a side view taken along line B-B in FIG. 2.

FIG. 1 is a single-line diagram illustrating a configuration of a gas insulated switching apparatus according to the present embodiment. FIG. 2 is a top view illustrating a configuration of the gas insulated switching apparatus according to the present embodiment. FIG. 3 is a side view of a power transmission and reception line unit taken along line A-A in FIG. 2. FIG. 4 is a side view of a transformer line unit of FIG. 2 as viewed from the same direction as in FIG. 3. FIG. 5 is a side view taken along line B-B in FIG. 2. The configuration of the gas insulated switching apparatus according to the present embodiment will be described below with reference to FIGS. 1 to 5. The gas insulated switching apparatus according to the present embodiment is, for example, a three-phase collective type in which a three-phase center conductor (not illustrated) through which the three-phase alternating current flows is housed in the same tank.

The gas insulated switching apparatus according to the present embodiment includes a transformer line unit 1 and a power transmission and reception line unit 2 disposed adjacent to the transformer line unit 1. Here, the transformer line unit 1 is a unit connected to a transformer (not illustrated). Further, the power transmission and reception line unit 2 is a unit connected to a power transmission line (not illustrated). The gas insulated switching apparatus may be configured to include other units other than the transformer line unit 1 and the power transmission and reception line unit 2.

First, the configuration of the transformer line unit 1 will be described. The transformer line unit 1 includes a breaker 5, connection tanks 31 and 32, bus-bar-side disconnectors 6 and 7 (second bus-bar-side disconnectors), an instrument current transformer 8 (second instrument current transformer), a line-side disconnector 9 (third line-side disconnector), an instrument voltage transformer 10 (second instrument voltage transformer), and a cable head 11.

The breaker 5 (second breaker) is specifically a vertical breaker. That is, the breaker 5 is such that the opening and closing direction is the vertical direction and a cylindrical breaker tank is disposed such that its axis is perpendicular to an installation surface 85. The breaker 5 includes three branch outlets on its side surface, two of the three branch outlets are drawn out to the side of bus-bars 3 and 4, and the remaining one is drawn out to the line side. Further, the line side is a side opposite to the side of the bus-bars 3 and 4.

The branch outlets of the breaker 5 on the side of the bus-bars 3 and 4 are provided at an interval in the vertical direction, the bus-bar-side disconnector 7 is connected to the upper branch outlet via the connection tank 31, and the bus-bar-side disconnector 6 is connected to the lower branch outlet via the connection tank 32. Further, it is also possible to provide a configuration in which the connection tanks 31 and 32 are not provided.

The bus-bar-side disconnector 7 is connected to the bus-bar 4. Further, the bus-bar-side disconnector 6 is connected to the bus-bar 3. Each of the bus-bars 3 and 4 extends in the horizontal direction perpendicular to the axis of the breaker 5. Further, the bus-bars 3 and 4 are connected to the adjacent power transmission and reception line unit 2. The extension direction in which the bus-bars 3 and 4 extend is the unit arrangement direction.

The bus-bar-side disconnector 7 is, for example, a disconnector with a grounding switch. That is, the bus-bar-side disconnector 7 includes, within the disconnector tank, the grounding switch in an integrated fashion. Further, the configuration may be such that the bus-bar-side disconnector 7 is not provided with the grounding switch in an integrated fashion. Similarly, the bus-bar-side disconnector 6 is, for example, a disconnector with a grounding switch.

The line-side disconnector 9 is connected to the branch outlet of the line side of the breaker 5 via the instrument current transformer 8. The line-side disconnector 9 is, for example, a disconnector with a grounding switch. The instrument voltage transformer 10 is disposed above the line-side disconnector 9. The instrument current transformer 8 measures the current flowing through a center conductor (not illustrated). The instrument voltage transformer 10 measures the voltage of the center conductor (not illustrated). Further, it is also possible to provide a configuration in which the instrument current transformer 8 and the instrument voltage transformer 10 are not provided.

The cable head 11 (third cable head) is connected to the bottom of the line-side disconnector 9. The cable head tank of the cable head 11 is disposed on the installation surface 85. A power cable 61 (third power cable) is connected to the cable head 11. The power cable 61 is connected to a transformer (not illustrated). In FIG. 4, only two phases of the three-phase power cable 61 are illustrated.

Next, the configuration of the power transmission and reception line unit 2 will be described. The power transmission and reception line unit 2 includes a breaker 12, connection tanks 22 and 23, bus-bar-side disconnectors 13 and 14 (first bus-bar-side disconnector), an instrument current transformer 15 (first instrument current transformer), a connection tank 24, an instrument voltage transformer 16 (first instrument voltage transformer), connection tanks 25 and 26, line-side disconnectors 17 and 19, and cable heads 18 and 20.

The breaker 12 (first breaker) is specifically a vertical breaker. That is, the breaker 12 is such that the opening and closing direction is the vertical direction and a cylindrical breaker tank is disposed such that its axis is perpendicular to the installation surface 85. Further, the breaker 12 is disposed to face the breaker 5 in the extension direction in which the bus-bars 3 and 4 extend. The breaker 12 includes three branch outlets on its side surface, two of the three branch outlets are drawn out to the side of the bus-bars 3 and 4, and the remaining one is drawn out to the line side.

The branch outlets of the breaker 12 on the side of the bus-bars 3 and 4 are provided at an interval in the vertical direction, the bus-bar-side disconnector 14 is connected to the upper branch outlet via the connection tank 22, and the bus-bar-side disconnector 13 is connected to the lower branch outlet via the connection tank 23. Further, it is also possible to provide a configuration in which the connection tanks 22 and 23 are not provided.

The bus-bar-side disconnector 14 is connected to the bus-bar 4. Further, the bus-bar-side disconnector 13 is connected to the bus-bar 3. Thus, the bus-bar-side disconnector 14 is connected to the bus-bar-side disconnector 7 via the bus-bar 4, and the bus-bar-side disconnector 13 is connected to the bus-bar-side disconnector 6 via the bus-bar 3. Each of the bus-bars 3 and 4 extends in the horizontal direction perpendicular to the axis of the breaker 12.

The bus-bar-side disconnector 14 is, for example, a disconnector with a grounding switch. Similarly, the bus-bar-side disconnector 13 is, for example, a disconnector with a grounding switch.

In this way, in the present embodiment, the bus-bar is duplicated. With such a redundant configuration (bus-bars 3 and 4), the reliability of the gas insulated switching apparatus is improved. Further, the present embodiment can also be applied to a single bus-bar system.

The connection tank 24 is connected to the line-side branch outlet of the breaker 12 via the instrument current transformer 15. The connection tank 24 (third T-shaped connection tank), for example, has a T-shape and includes three connection ports. That is, the connection tank 24 has two connection ports in the horizontal direction orthogonal to the extension direction in which the bus-bars 3 and 4 extend, and has a connection port in the upper part. Further, the instrument current transformer 15 is connected to the connection port of the connection tank 24 on the breaker 12 side, the instrument voltage transformer 16 is connected to the upper connection port, and the connection tank 25 is connected to the remaining connection port. In addition, the connection tank 24 is disposed to face the line-side disconnector 9 in the extension direction in which the bus-bars 3 and 4 extend. Further, it is also possible to provide a configuration in which the instrument current transformer 15, the instrument voltage transformer 16, and the connection tank 24 are not provided.

Hereinafter, the horizontal direction orthogonal to the extension direction in which the bus-bars 3 and 4 extend is referred to as a "unit direction". The unit direction is a direction orthogonal to the unit arrangement direction. Further, the length in the unit direction of the gas insulated switching apparatus is referred to as a "unit length".

The connection tank 25 (first T-shaped connection tank), for example, has a T-shape, is disposed in a horizontal plane, and includes three connection ports. That is, the connection tank 25 includes connection ports 25a and 25b, which are open in the unit direction, and a connection port 25c, which is open in the extension direction in which the bus-bars 3 and 4 extend.

The connection port 25a is open to the breaker 12 side and is connected to the connection tank 24. Thus, the connection port 25a (first connection port) is connected to the side surface of the breaker 12 via the connection tank 24 and the instrument current transformer 15.

The connection port 25b (second connection port) is disposed on the opposite side of the connection port 25a in the unit direction, is open to the side opposite to the connection port 25a, and is connected to the line-side disconnector 17 (first line-side disconnector).

The line-side disconnector 17 is, for example, a disconnector with a grounding switch. The cable head 18 (first cable head) is connected to the bottom of the line-side disconnector 17. The cable head tank of the cable head 18 is disposed on the installation surface 85. A power cable 60 (first power cable) is connected to the cable head 18. The power cable 60 is connected to a power transmission line (not illustrated). In FIG. 3, only two phases of the three-phase power cable 60 are illustrated. Thus, the connection port 25b is connected to the cable head 18 via the line-side disconnector 17.

The connection port 25c (fourth connection port) is open to the transformer line unit 1 side. The connection port 25c is connected to the connection tank 26. That is, the connection tank 25 is connected to the connection tank 26.

The connection tank 26 (second T-shaped connection tank), for example, has a T-shape, is disposed in the horizontal plane, and includes the three connection ports. That is, the connection tank 26 includes connection ports 26a and 26b, which are open in the extension direction in which the bus-bars 3 and 4 extend, and a connection port 26c, which is open in the unit direction. The connection port 26b (sixth connection port) is covered with a cover plate.

The connection tank 26 is disposed behind the transformer line unit 1. That is, in the unit direction in which the breaker 5 and the line-side disconnector 9 are connected, the connection tank 26 is disposed behind the line-side disconnector 9 as viewed from the breaker 5. In contrast, the connection tank 25 is disposed between the breaker 12 and the line-side disconnector 17, and the breaker 12, the connection tank 25, and the line-side disconnector 17 are disposed in the unit direction.

The connection port 26a (fifth connection port) is connected to the connection port 25c. The connection port 26c (third connection port) is open in the same direction as the connection port 25b. Further, the connection ports 26c and 25b are disposed at an interval between the units in the extension direction in which the bus-bars 3 and 4 extend. The interval between the units is an interval in the extension direction in which the bus-bars 3 and 4 extend, between the transformer line unit 1 and the power transmission and reception line unit 2. The line-side disconnector 19 (second line-side disconnector) is connected to the connection port 26c.

The line-side disconnector 19 is, for example, a disconnector with a grounding switch. The line-side disconnectors 17 and 19 are disposed to face each other in the extension direction in which the bus-bars 3 and 4 extend, and are disposed at intervals between the units. The cable head 20 (second cable head) is connected to the bottom of the line-side disconnector 19 (FIG. 2). The cable head tank of the cable head 20 is disposed on the installation surface 85. A power cable (second power cable) (not illustrated) is connected to the cable head 20 and the power cable is connected to a power transmission line (not illustrated).

The cable heads 18 and 20 are arranged at an interval between the units in the extension direction in which the bus-bars 3 and 4 extend. Further, the cable head 18 is disposed in the unit direction as viewed from the breaker 12. Also, the cable head 20 is disposed behind the cable head 11 in the unit direction, as viewed from the breaker 5. In other words, the breaker 5, the cable head 11, and the cable head 20 are arranged in the unit direction including the breaker 5. Further, the connection tank 26 is disposed between the cable head 11 and the cable head 20 in the unit direction.

Further, the connection tank 26 can be formed in the same shape as the connection tanks 24 and 25. Thus, it is possible to reduce the manufacturing cost.

Also, the connection tanks 25 and 26 can be an integral connection tank with a bifurcated structure rather than separated bodies.

Figure 10:
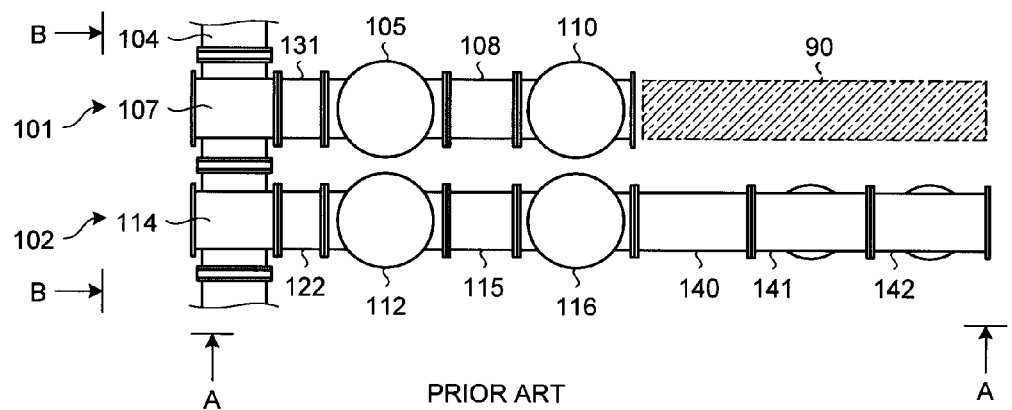
FIG. 10 is a top view illustrating a configuration of a conventional gas insulated switching apparatus.
Figure 11:
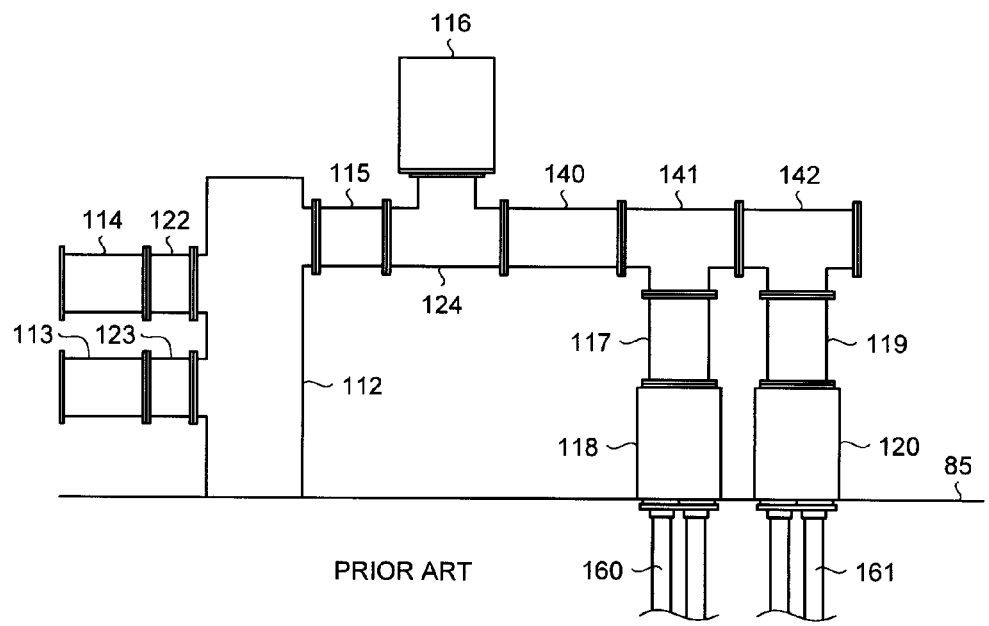
FIG. 11 is a side view of the power transmission and reception line unit taken along line A-A in FIG. 10.
Figure 12:
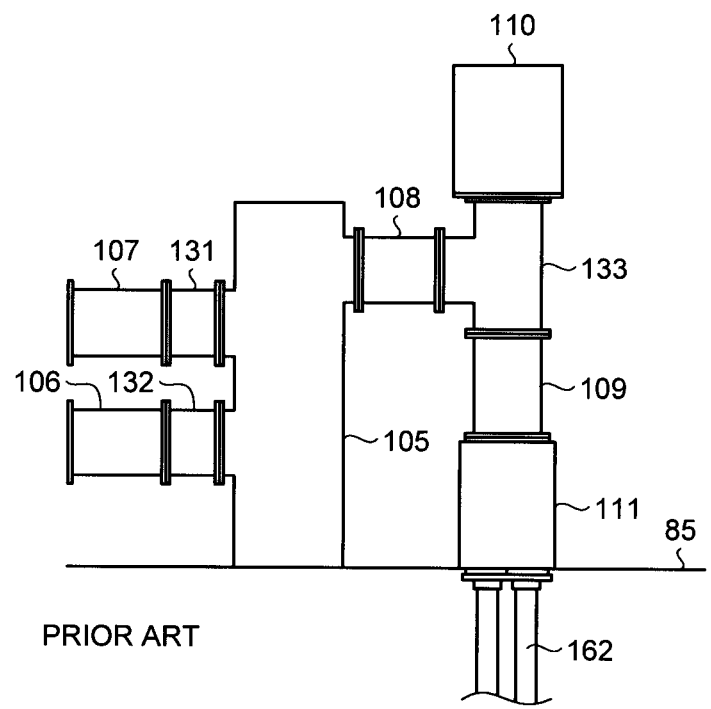
FIG. 12 is a side view of a transformer line unit of FIG. 10 as viewed from the same direction as in FIG. 11.
Figure 13:
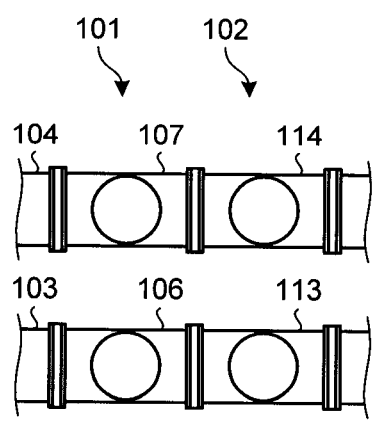
FIG. 13 is a side view taken along line B-B in FIG. 10.

Next, the effect of the present embodiment will be described in comparison with a configuration of a conventional gas insulated switching apparatus. FIG. 10 is a top view illustrating a configuration of a conventional gas insulated switching apparatus. FIG. 11 is a side view of a power transmission and reception line unit taken along line A-A in FIG. 10. FIG. 12 is a side view of a transformer line unit of FIG. 10 as viewed from the same direction as FIG. 11. FIG. 13 is a side view taken along line B-B in FIG. 10. Further, because a single-line diagram of the conventional gas insulated switching apparatus is the same as FIG. 1 except for reference numerals, it will not be described.

As illustrated in FIGS. 10 to 13, the conventional gas insulated switching apparatus is provided with a transformer line unit 101 and a power transmission and reception line unit 102 disposed adjacent to the transformer line unit 101. The transformer line unit 101 and the power transmission and reception line unit 102 are connected by bus-bars 103 and 104.

The transformer line unit 101 is provided with a breaker 105, connection tanks 131 and 132, bus-bar-side disconnectors 106 and 107, an instrument current transformer 108, a connection tank 133, an instrument voltage transformer 110, a line-side disconnector 109, and a cable head 111, and the cable head 111 is connected to a power cable 162.

The power transmission and reception line unit 102 is provided with a breaker 112, connection tanks 122 and 123, bus-bar-side disconnectors 113 and 114, an instrument current transformer 115, a connection tank 124, an instrument voltage transformer 116, connection tanks 140 to 142, line-side disconnectors 117 and 119, and cable heads 118 and 120. The cable head 118 is connected to power cables 160 and the cable head 120 is connected to power cables 161.

In the conventional power transmission and reception line unit 102, the cable heads 118 and 120 are arranged in the unit direction via the connection tanks 140 to 142. Therefore, the unit length of the power transmission and reception line unit 102 increases, and the installation area of the gas insulated switching apparatus also increases. Meanwhile, because a rear space 90 is formed behind the transformer line unit 101 and the equipment is not disposed, the space is not effectively utilized.

In contrast, in the present embodiment, the cable heads 18 and 20 are arranged at an interval between the units in the extension direction in which the bus-bars 3 and 4 extend, and the cable head 20 is disposed behind the transformer line unit 1. Thus, the unit length of the power transmission and reception line unit 2 is reduced, and a common rear space 50 is formed behind the transformer line unit 1 and the power transmission and reception line unit 2. Thus, the installation area of the gas insulated switching apparatus is reduced by the area of the rear space 50.

Further, in the above-described conventional gas insulated switching apparatus, although the line-side disconnector 117 is provided above the cable head 118 and the line-side disconnector 119 is provided above the cable head 120, in this case, in order to achieve a double structure, it is necessary to dispose the connection tank 141 above the line-side disconnector 117 and dispose the connection tank 142 above the line-side disconnector 119. In this case, the height of the power transmission and reception line unit 102 increases by the height of the connection tanks 141 and 142. Also, the height of the voltage transformer line unit 101 increases in accordance with the height of the power transmission and reception line unit 102. Therefore, the overall height increases in the conventional gas insulated switching apparatus.

In contrast, in the present embodiment, because the cable heads 18 and 20 are arranged in the extension direction in which the bus-bars 3 and 4 extend by using the horizontally disposed connection tanks 25 and 26 that have a bifurcated shape as a whole, there is no need to provide a connection tank above the line-side disconnectors 17 and 19. Thus, when compared to the conventional gas insulated switching apparatus, the height of the power transmission and reception line unit 2 is reduced and the height of the transformer line unit 1 is also reduced accordingly. Thus, the height of the gas insulated switching apparatus is also reduced. Therefore, a stable structure can be achieved and seismic resistance is also improved. Also, it is also possible to reduce the required number of connection tanks.

In FIG. 3, a reduction in height when compared to FIG. 11 is represented by lower spaces 51 and 52. Further, in FIG. 3, a power cable represented by a dotted line below the power cable 60 indicates the positions of the power cables 160 and 161 of FIG. 11 for comparison. Similarly, in FIG. 4, a reduction in height when compared to FIG. 12 is represented by lower spaces 53 and 54. Further, in FIG. 4, the power cable represented by a dotted line below the power cable 61 indicates the position of the power cable 162 of FIG. 12 for comparison.

Second Embodiment

Figure 6:
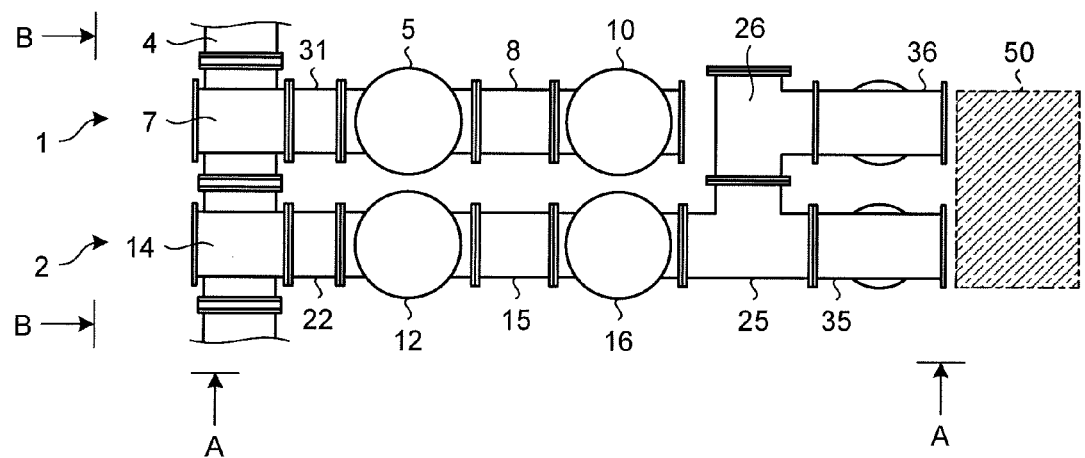
FIG. 6 is a top view illustrating a configuration of a gas insulated switching apparatus according to a second embodiment.
Figure 7:
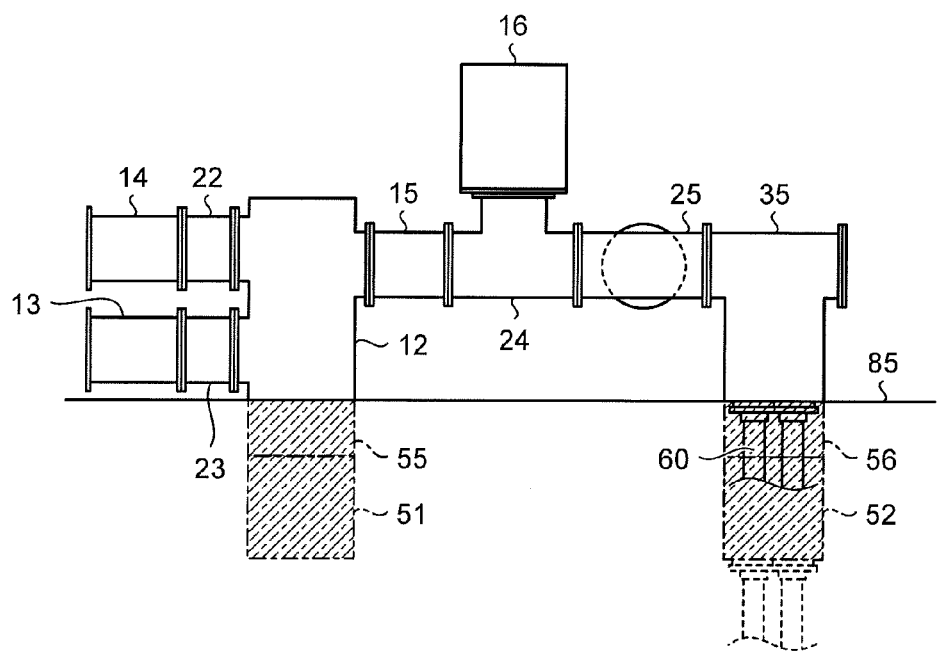
FIG. 7 is a side view of a power transmission and reception line unit taken along line A-A in FIG. 6.
Figure 8:
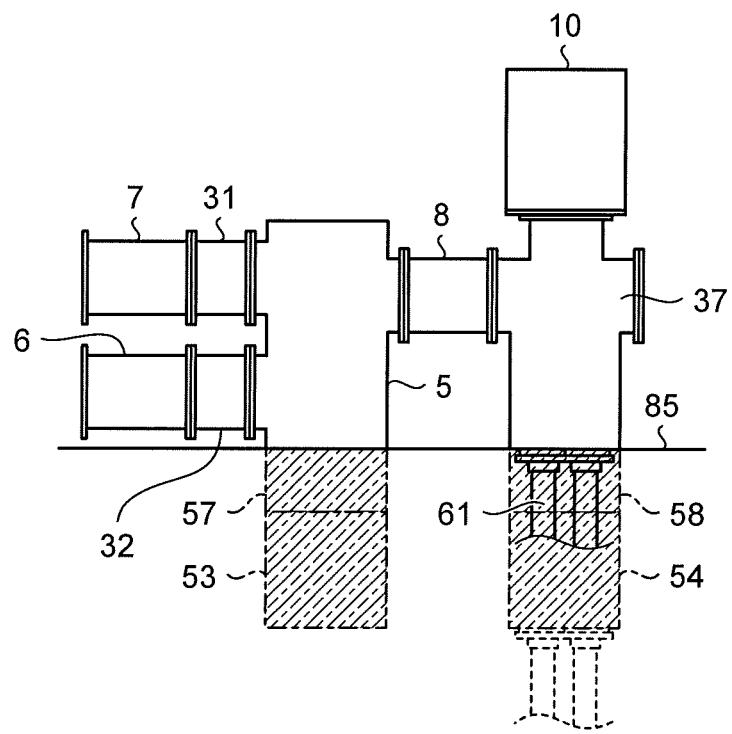
FIG. 8 is a side view of a transformer line unit of FIG. 6 as viewed from the same direction as in FIG. 7.
Figure 9:
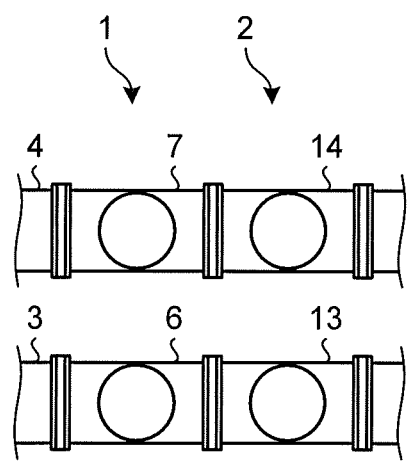
FIG. 9 is a side view taken along line B-B in FIG. 6.

FIG. 6 is a top view illustrating a configuration of a gas insulated switching apparatus of the present embodiment; FIG. 7 is a side view of the power transmission and reception line unit taken along line A-A in FIG. 6; FIG. 8 is a side view of a transformer line unit of FIG. 6 as viewed from the same direction as FIG. 7; and FIG. 9 is a side view taken along line B-B in FIG. 6. A single-line diagram of the present embodiment is the same as that of FIG. 1. Further, in FIGS. 6 to 9, the same constituent elements as those of FIGS. 1 to 5 are denoted by the same reference numerals and the detailed description thereof will not be described.

As illustrated in FIGS. 6 to 9, in the present embodiment, the line-side disconnector 17 and the cable head 18 of the first embodiment are housed within the cable head tank 35 of the cable head 18, and the line-side disconnector 19 and the cable head 20 of the first embodiment are housed within the cable head tank 36 of the cable head 20. Similarly, the line-side disconnector 9 and the cable head 11 of the first embodiment are housed within the cable head tank 37 of the cable head 11. That is, in the present embodiment, the line-side disconnector 17 and the cable head 18 are integrated, the line-side disconnector 19 and the cable head 20 are integrated, and the line-side disconnector 9 and the cable head 11 are integrated.

According to the present embodiment, the height of the gas insulated switching apparatus can be further reduced when compared to that of the first embodiment. In FIG. 7, a reduction in height when compared to FIG. 3 is represented by the lower spaces 55 and 56. Further, in FIG. 7, the power cable represented by a dotted line below the power cable 60 indicates the positions of the power cables 160 and 161 of FIG. 11 for comparison. Similarly, in FIG. 8, a reduction in height when compared to FIG. 4 is represented by the lower spaces 57 and 58. Further, in FIG. 8, the power cable represented by a dotted line below the power cable 61 indicates the position of the power cable 162 of FIG. 12 for comparison. Other effects of the present embodiment are the same as those of the first embodiment.

INDUSTRIAL APPLICABILITY

As described above, the present invention is useful as a gas insulated switching apparatus.

REFERENCE SIGNS LIST 1, 101 transformer line unit, 2, 102 power transmission and reception line unit, 3, 4, 103, 104 bus-bar, 5, 12, 105, 112 breaker, 6, 7, 13, 14, 106, 107, 113, 114 bus-bar-side disconnector, 8, 15, 108, 115 instrument current transformer, 9, 17, 19, 109, 117, 119 line-side disconnector, 10, 16, 110, 116 instrument voltage transformer, 11, 18, 20, 111, 118, 120 cable head, 22 to 26, 31, 32, 122 to 124, 131, 132, 133, 140 to 142 connection tank, 25a, 25b, 25c, 26a, 26b, 26c connection port, 50 rear space, 51 to 54 lower space, 60, 61, 160 to 162 power cable, 85 installation surface.

The invention claimed is:
1. A gas insulated switching apparatus comprising a power transmission and reception line unit connected to a bus-bar extending horizontally and a transformer line unit disposed adjacent to the power transmission and reception line unit and connected to the bus-bar, wherein
the power transmission and reception line unit includes:

a first breaker disposed such that an axis thereof is perpendicular to a horizontally extending installation surface, a first bus-bar side disconnector that is connected to a side surface of the first breaker facing a bus-bar side of the first breaker and is connected to the bus-bar, a connection tank having a first connection port opening to a first breaker side of the connection tank and connected, via the first connection port, to a side surface of the first breaker, the side surface of the first breaker on an opposite side from the side surface of the first breaker facing the bus-bar side of the first breaker, a first line-side disconnector connected to the connection tank via a second connection port of the connection tank opening in an opposite direction to the first connection port, a first cable head that is connected to a bottom of the first line side disconnector and is connected to a first power cable, a second line side disconnector that is connected to the connection tank via a third connection port of the connection tank opening in a same direction as the second connection port, the third connection port being disposed at an interval between the power transmission and reception line unit and the transformer line unit in a horizontally extending extension direction in which the bus-bar extends with respect to the second connection port, and a second cable head that is connected to a bottom of the second line side disconnector and is connected to a second power cable, the transformer line unit includes:

a second breaker disposed such that an axis thereof is perpendicular to the installation surface, a second bus-bar side disconnector that is connected to a side surface of the second breaker facing in a same direction as the bus-bar side of the first breaker and is connected to the bus-bar, a third line-side disconnector connected to a side surface of the second breaker on an opposite side from the side surface of the second breaker facing the bus-bar side, and a third cable head that is connected to a bottom of the third line side disconnector and is connected to a third power cable, when viewed from the first breaker, the first cable head is disposed in a horizontally extending unit direction orthogonal to the extension direction in which the bus-bar extends, the first and second cable heads are arranged in the extension direction in which the bus-bar extends at the interval between the power transmission and reception line unit and the transformer line unit, when viewed from the second breaker, the second cable head is disposed behind the third cable head in the unit direction, and a part of the connection tank including the third connection port is disposed between the third cable head and the second cable head in the unit direction.

2. The gas insulated switching apparatus according to claim 1, wherein both the first line-side disconnector and the first cable head are housed within a first cable head tank, both the second line-side disconnector and the second cable head are housed within a second cable head tank, and both the third line-side disconnector and the third cable head are housed within a third cable head tank.

3. The gas insulated switching apparatus according to claim 1, wherein the connection tank is formed by connecting first and second T-shaped connection tanks having a same shape, the first T-shaped connection tank has the first and second connection ports and a fourth connection port that is open in the extension direction in which the bus-bar extends, and the second T-shaped connection tank has the third connection port and a fifth connection port connected to the fourth connection port of the first T-shaped connection tank.

4. The gas insulated switching apparatus according to claim 1, wherein the power transmission and reception line unit further includes:

a first instrument current transformer and a third T-shaped connection tank sequentially disposed between the first breaker and the first connection port, and a first instrument voltage transformer disposed above the third T-shaped connection tank, and the transformer line unit further includes:

a second instrument current transformer disposed between the second breaker and the third line-side disconnector, and a second instrument voltage transformer disposed above the third line-side disconnector.

\* \* \* \* \*